United States Patent [19]
Arave

[11] 3,744,301
[45] July 10, 1973

[54] ULTRASONIC VOID FRACTION DETECTOR

[75] Inventor: Alvin E. Arave, Idaho Falls, Idaho

[73] Assignee: The United States of America as represented by the United States Atomic Energy Commission, Washington, D.C.

[22] Filed: Sept. 9, 1971

[21] Appl. No.: 178,988

[52] U.S. Cl. ............................ 73/67.6, 73/290 V
[51] Int. Cl. .......................................... G01n 29/00
[58] Field of Search ................ 73/67.5, 67.6, 67.7, 73/67.8, 67.9, 290 V

[56] References Cited
UNITED STATES PATENTS

| 3,010,318 | 11/1961 | Mongan | 73/290 V |
|---|---|---|---|
| 3,273,146 | 9/1966 | Hurwitz | 73/67.8 X |
| 3,292,143 | 12/1966 | Russell | 73/67.6 |
| 3,595,069 | 7/1971 | Fowler | 73/67.9 X |
| 3,540,275 | 11/1970 | Post et al. | 73/290 V |

Primary Examiner—Richard C. Queisser
Assistant Examiner—Arthur E. Korkosz
Attorney—Roland A. Anderson

[57] ABSTRACT

The attenuation of an ultrasonic tone burst propagated in a wire is measured to determine the void fraction of a gas-liquid mixture. When the gas-liquid mixture consists of a layer of gas over a liquid, the void fraction detector can be used as a liquid level indicator.

5 Claims, 8 Drawing Figures

ULTRASONIC VOID FRACTION DETECTOR

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

In order to obtain the necessary measurements for control over fluids in a reactor, it is necessary to have sensors to measure fluid levels and the void fraction of gas-liquid mixtures. A sensor used in a reactor must be reliable and also must be rugged in order to withstand the reactor core environment. For example, temperature ranges from 200°F. to 1,000°F. are present in the reactor core. High pressures approaching 2,500 psi and radiation of $10^{15}$ nvt are present.

Most void fraction detectors cannot be used in the reactor environment. Those that are rugged enough to withstand the environment suffer from low sensitivity, poor resolution, slow response, or cannot meet the size and range requirements. In addition to the ruggedness and reliability of the sensor itself, the electrical-mechanical seals necessary to place many of the prior art sensors in the reactor environment will not withstand the environment.

It is therefore an object of this invention to provide a small simple rugged void fraction detector which can be used in a reactor environment.

Another object of this invention is to provide a void fraction detector which does not require electrical penetrations into the media which are to be measured.

BRIEF DESCRIPTION OF THE INVENTION

The attenuation of an ultrasonic stress wave burst in a metal transmission line is a function of the acoustical impedance of the media surrounding the transmission line. The stress wave attenuation is increased when the liquid surrounding the transmission line absorbs part of the transmitted energy. By measuring the attenuation of the stress wave in the transmission line, the void fraction of a gas-liquid mixture into which the transmission line is positioned can be measured. Where the gas-liquid mixture consists of a liquid covered by a gas, the attenuation of the stress wave is a function of the liquid level and the void fraction detector can be used as a liquid level indicator.

DETAILED DESCRIPTION OF THE INVENTION

Figure 1:
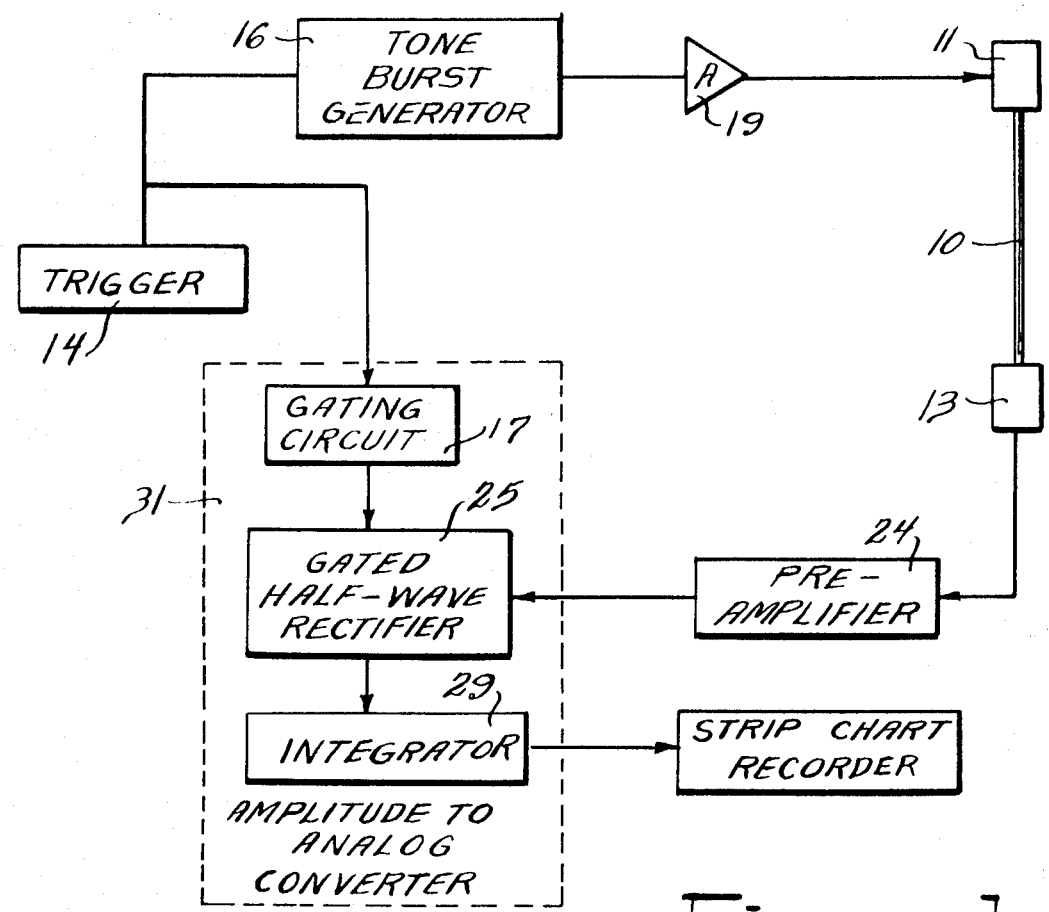
FIG. 1 is a block diagram of the void fraction detector system.

Referring to FIG. 1, a transmission line 10 has transducers 11 and 13 on opposite ends thereof. In the operation of this invention, transmission line 10 would be positioned in a gas-liquid mixture, as will be described in a subsequent portion of this specification. Trigger circuit 14 provides trigger pulses for tone burst generator 16 and a gating circuit 17. In response to the trigger pulse, tone burst generator 16 generates an ultrasonic tone burst. The tone burst is amplified in amplifier 19 and coupled to transducer 11 to develop a stress wave in the transmission line 10. The stress wave is an ultrasonic tone burst which travels along the transmission line to receiving transducer 13.

Figure 2:
FIGS. 2 and 3 illustrate the propagation of stress waves in the transmission line.
Figure 2:
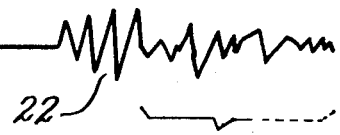
Figure 3:
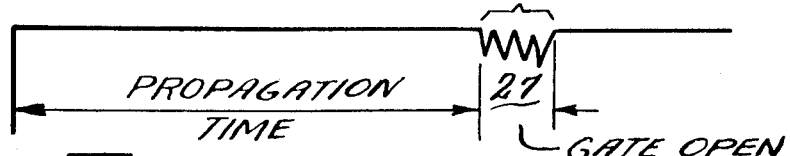

Referring also to FIGS. 2 and 3 in conjunction with FIG. 1, tone burst 21, having a predetermined time duration, is applied to transducer 11 and produces an ultrasonic stress wave in transmission line 10. The stress wave travels along the transmission line and is received at transducer 13 after a time interval equal to the propagation time of the tone burst wave 21 along transmission line 10. The received wave is shown as 22 in FIG. 2 and consists of the received signal plus reflections in the detector. The received wave is coupled to preamp 24 for amplification and to a gated half-wave rectifier 25. Gating circuit 17 is responsive to the trigger pulse from trigger circuit 14 to open the half-wave rectifier 25 after a delay equal to the propagation time, so that only the received signal portion of the received wave 22 is admitted to the half-wave rectifier. The half-wave rectified output of the received signal 27 is shown in FIG. 3. The half-wave rectified output is integrated in integrator 29 to develop an output signal which is recorded on strip chart recorder 30.

The amplitude of the signal recorded on strip chart recorder 30 is a function of the attenuation in the transmission line 10 which, in turn, is a function of the amount of liquid covering the transmission line. As the surface area of the transmission line exposed to the liquid increases, more energy is lost from the transmission line into the liquid and thus the attenuation is greater. Thus the amplitude of the signal received by transducer 13 is a function of the amount of liquid in contact with the surface area of the transmission line 10 and thus a measure of the void fraction of the gas-liquid mixture. Where the gas-liquid mixture consists of a liquid covered by a gas, the void fraction detector is usable to determine the liquid level, since the void fraction is a function of the liquid level.

Figure 4:
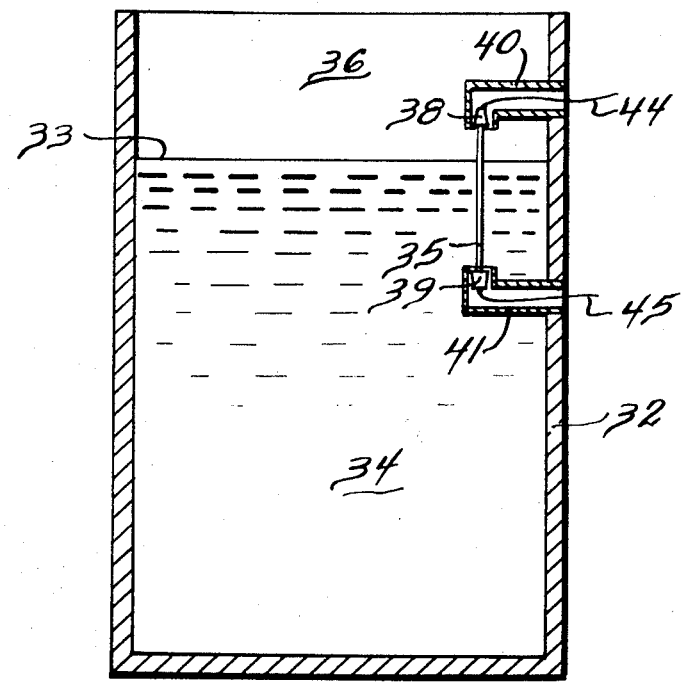
FIG. 4 shows the transmission line and transducers of the void fraction detector used as a liquid level indicator.

Referring to FIG. 4, there is shown the use of the void fraction detector of this invention as a liquid level indicator. The liquid is held in a container 32 and has a level 33. Transmission line 35 is immersed partly in liquid 34 and partly in the gas 36 which is above the liquid 34. Thus the void fraction measured by transmission line 35 is an indication of the level 33 of the liquid 34.

The transducers 38 and 39 can be completely enclosed in tubes 40 and 41 which are sealed from the liquid 34 and the gas 36. Thus the electrical connections 44 and 45 do not come into contact with the liquid 34 or the gas 36 and there is no problem of obtaining a seal at this point. For example, container 32 and the housings for transducers 38 and 39 can be formed of stainless steel which is highly resistant to the corrosive environment of a nuclear reactor.

Figure 5:
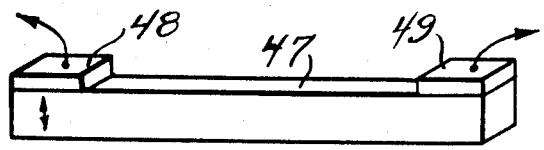
FIGS. 5 and 6 show alternative forms of the transmission line.
Figure 6:
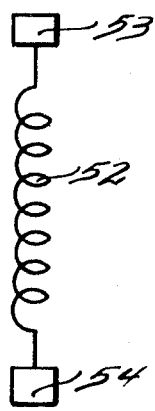

Referring to FIG. 5, there is shown a bar-type transmission line 47 which is used with shear waves. The shear wave is introduced into the bar by a magnetostrictive transducer 48 operating in the compressional mode. At the transducer-detector interface, mode conversion to a shear wave takes place. Receiving transducer 49 is also shown. In the shear mode, the bar configuration is insensitive to thin layers of liquid or gas that can give a residual effect under dynamic conditions. The liquid on the surface of the bar must be a significant portion of a wavelength to cause attenuation of the signal. Thus where a bar configuration is used as a liquid level indicator, small droplets of the liquid which might cling to the bar would not significantly attenuate the tone burst being transmitted by the bar transmission line and thus would not cause an error in the liquid level indication.

Where a wire is used as a transmission line, the attenuation is very small and long lengths of wire must be used in order to achieve appreciable attenuation. The long length of wire in a short space can be obtained by coiling the wire to form a transmission line 52 of FIG. 6 which is in the form of a helical coil. The wire, of course, can be formed in other patterns in order to achieve the long length in the short space. Transducers 53 and 54 are connected to opposite ends of the transmission line as in the previous examples.

Figure 7:
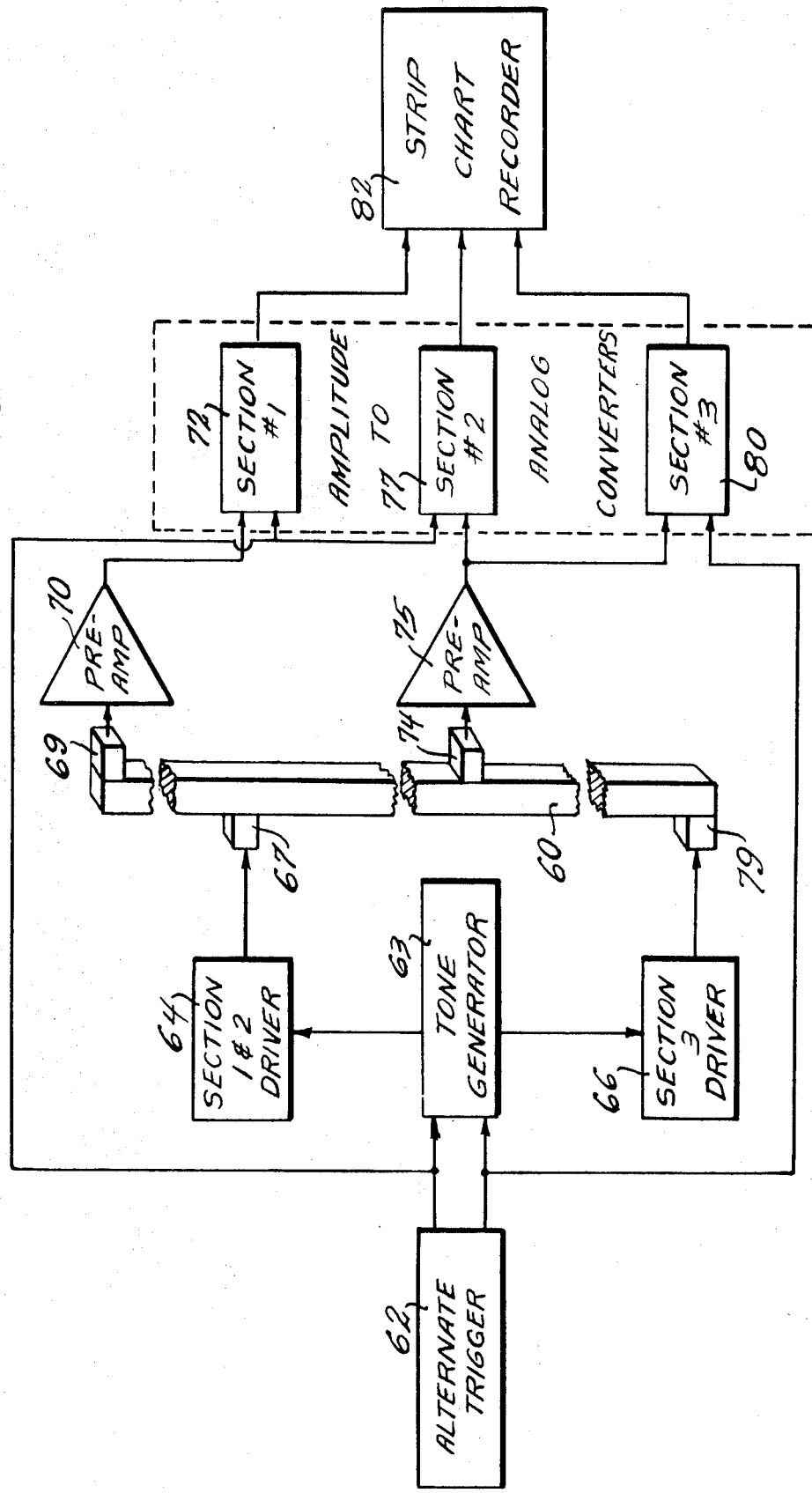
FIG. 7 is a block diagram illustrating the operation of a multiple section transmission line.

Referring to FIG. 7, there is shown a void fraction detector or liquid level detector wherein the range over which detection is to take place is too great to use a single length of transmission line. In this example, the transmission line 60 is in the form of a bar and divided into three sections. A trigger circuit 62 provides alternately spaced triggers to the tone generator 63. Tone generator 63 furnishes a tone burst to section 1 and 2 driver 64 during one time interval and to the section 3 driver 66 during a subsequent time interval. Section 1 and 2 driver 64 is connected to the transducer 67 for the transmission line sections 1 and 2. The signal traveling through the first section of the transmission line is received by transducer 69 and coupled through preamplifier 70 to the section 1 amplifier-to-analog converter 72. Amplifier-to-analog converter 72 may be similar to amplitude-to-analog converter 31 of FIG. 1 and develops an output signal proportional to the attenuation of the tone burst in the first section of the transmission line. The tone burst traveling through section 2 of the transmission line is received by receiving transducer 74, amplified in preamplifier 75 and coupled to the section 2 amplitude-to-analog converter 77. The tone burst for the third section of the transmission line is developed in driving amplifier 66 and coupled to transducer 79. The tone burst traveling through the third section of the transmission line is received by transducer 74 and amplified by preamplifier 75 and coupled to section 3 amplitude-to-analog converter 80. The output signal from the second and third sections of the transmission line are coupled to both the section 2 and section 3 amplitude-to-analog converters. The amplitude-to-analog converters distinguish between the two signals as they are triggered on at the proper time by the different trigger signals from the alternate trigger circuit 62. These two trigger signals are timed so as to gate on the proper amplitude-to-analog converter to prevent interference between the signals in the second and third sections of the transmission line. The outputs from the amplitude-to-analog converters 72, 77 and 80 are coupled to a strip chart recorder 82. By this means, the effective length of the transmission line can be extended. Additional sections could be added to the transmission line in a similar manner if this is required.

Figure 8:
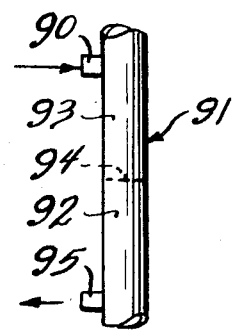
FIG. 8 illustrates the use of the walls of the container as the transmission line.

Referring to FIG. 8, there is shown an embodiment of the void fraction detector in which the walls of the containing vessel, in this case a tube, are used to form the transmission line. A signal is received on transducer 90 and generates a burst stress wave in the side wall of the container tube 91. In this example, tube 91 has a liquid 92 and a gas 93 with a liquid level 94. The tone burst is received on transducer 95 and processed in the manner described for the previous embodiments. With the tube 91 formed of a material which will support a stress wave, the tube itself can be used as the transmission line and an additional transmission line is not required. The advantage of this is that penetration of the containment wall is not required.

The embodiments of the invention in which an exclusive property or privilege is claimed are defined as follows:

1. A void fraction detector for measuring the fraction of gas in a gas liquid mixture, comprising, a transmission line capable of supporting a stress wave therein positioned in contact with the gas liquid mixture, said stress wave travelling through said transmission line in a predetermined time interval, generating means for developing a driving signal having an ultrasonic frequency and a particular time duration, a trigger circuit coupled to said generating means and acting to develop a first gating signal and a second gating signal said predetermined time interval after said first gating signal said generating means being responsive to said first gating signal to develop said driving signal, a generating transducer coupled to said generating means and to one end of said transmission line, said generating transducer being responsive to said driving signal to develop said stress wave with said stress wave having said particular time duration at said ultrasonic frequency, a receiving transducer coupled to the other end of said transmission line and responsive to said stress wave to develop an output signal, having a magnitude proportional to the magnitude of said stress wave at said receiving transducer measuring means, and gating means coupled to said trigger circuit and coupling said receiving transducer to said measuring means, said gating means being responsive to said second gating signal to permit the passage for said particular time duration of said output signal from said receiving transducer to said measuring means, said measuring means acting to measure the magnitude of said output signal.

2. The void fraction detector of claim 1 wherein said transmission line is a wire in the form of a helical coil positioned in the gas-liquid mixture with said generating and receiving transducers being coupled to the ends of said wire.

3. The void fraction detector of claim 1 wherein said transmission line is in the form of a bar with said stress wave being a shear wave, said generating and said receiving transducers being coupled to the ends of said bar.

4. The void fraction detector of claim 1, further including a container for containing said gas-liquid mixture and having side walls, said generating and receiving transducers being mechanically coupled to said side walls with the portion of said side walls extending between said transducers being said transmission line.

5. A void fraction detector for measuring the fraction of gas in a gas liquid mixture, comprising, a transmission line capable of supporting a stress wave therein positioned in contact with the gas liquid mixture, said transmission line having a plurality of sections, a plurality of generating transducers and a plurality of receiving transducers, one of said generating and receiving transducers being positioned at one end of said transmission line and coupled thereto, the remaining ones of said generating and receiving transducers being positioned alternately from said one end of said transmission line to the other end of said transmission line with the transducer positioned at said other end of said transmission line being coupled thereto, the transducers intermediate said one end of said transmission line and said other end of said transmission line being positioned at the boundaries between said transmission line sections with each intermediate transducer being coupled to both transmission line sections at the boundary, a plurality of generating means each coupled to a separate one of said generating transducers, a trigger circuit coupled to each of said generating means and acting to develop a plurality of first gating signals and a plurality of second gating signals, each of said generating means being selectively energized by a first gating signal applied thereto to develop a driving signal having an ultrasonic frequency and a particular time duration, each of said generating transducers being responsive to said driving signal applied thereto to develop said stress wave in each transmission line section coupled thereto with said stress wave having said particular time duration and said ultrasonic frequency, measuring means, a plurality of gating means each coupling a separate one of said receiving transducers to said measuring means, each of said receiving transducers being responsive to a stress wave burst in a section of said transmission line coupled thereto to develop an output signal having a magnitude proportional to the magnitude of said stress wave, circuit means coupling each of said gating means to said trigger circuit, each of said gating means being selectively responsive to one of said plurality of second gating signals to couple selectively particular ones of said output signals to said measuring means, said measuring means acting to measure the magnitude of each of said output signals coupled thereto.

* * * * *